United States Patent [19]
Keith

[11] 3,982,780
[45] Sept. 28, 1976

[54] CONFORMABLE PLASTIC BODY SIDE MOLDING

[75] Inventor: Roger H. Keith, White Bear Lake, Minn.

[73] Assignee: Minnesota Mining and Manufacturing Company, St. Paul, Minn.

[22] Filed: Apr. 21, 1975

[21] Appl. No.: 570,084

[52] U.S. Cl. ................................. 293/1; 52/716; 293/62
[51] Int. Cl.² ................................. B60R 13/04
[58] Field of Search .......... 293/DIG. 4, 1, 62, 71 R; 52/716–718

[56] References Cited
UNITED STATES PATENTS

| | | |
|---|---|---|
| 3,380,193 | 4/1968 | Hill .................................. 293/1 X |
| 3,419,458 | 12/1968 | Brooks et al. .................. 293/DIG. 4 |
| 3,472,546 | 10/1969 | Samuels ........................ 293/DIG. 4 |
| 3,543,465 | 12/1970 | Jackson .............................. 293/1 X |
| 3,572,799 | 3/1971 | Truesdell et al. ...................... 293/1 |
| 3,687,502 | 8/1972 | Loew .................................... 293/1 |

*Primary Examiner*—Robert B. Reeves
*Assistant Examiner*—John P. Shannon
*Attorney, Agent, or Firm*—Alexander, Sell, Steldt & DeLaHunt

[57] ABSTRACT

Body side molding for automotive vehicles comprising a plastic body formed with at least one broad channel which communicates with the bottom of the molding to enable its bottom surface to conform to curved surfaces without distorting the top of the molding. This permits the molding to be permanently adhered to the variety of contours presented by automotive vehicles.

12 Claims, 8 Drawing Figures

U.S. Patent  Sept. 28, 1976  3,982,780
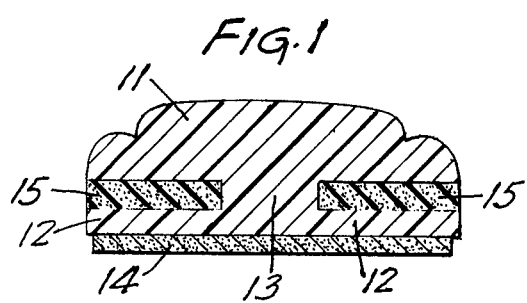
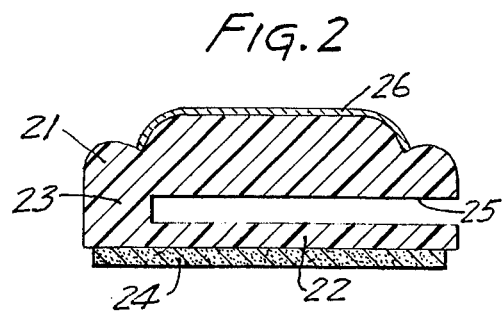
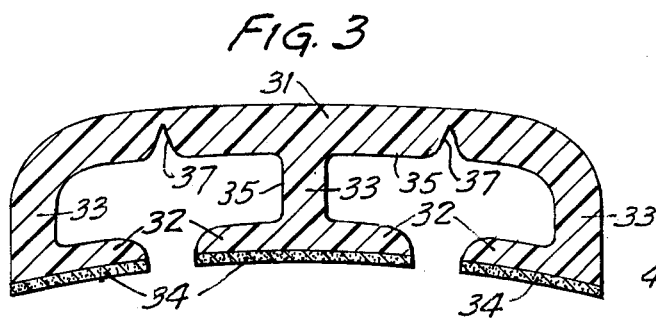
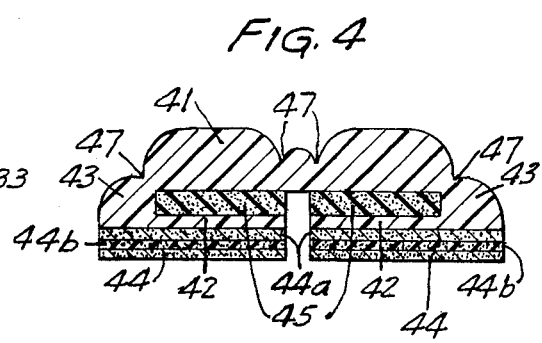
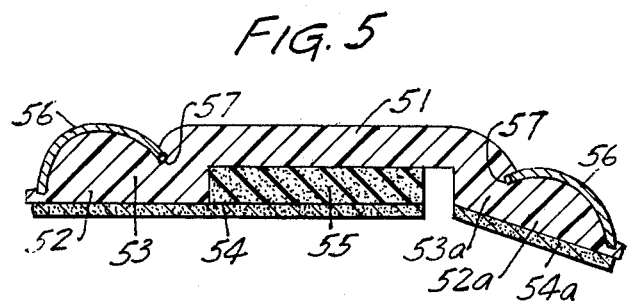
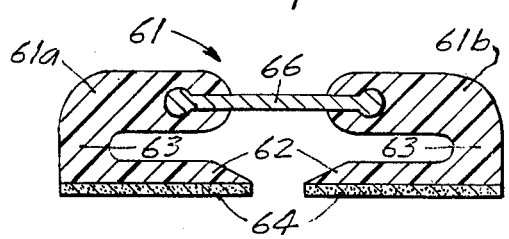
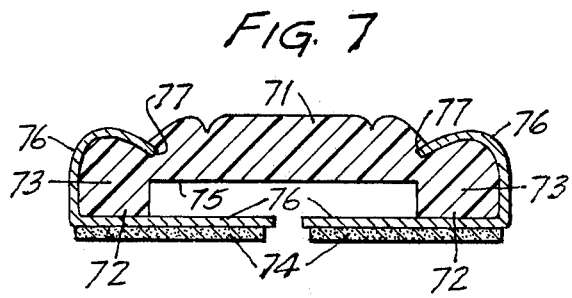
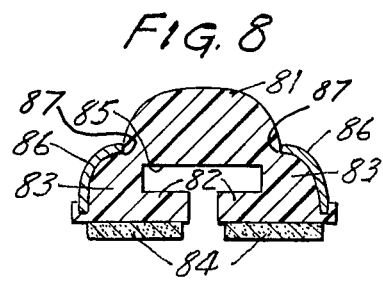

CONFORMABLE PLASTIC BODY SIDE MOLDING

FIELD OF THE INVENTION

The invention concerns plastic body moldings of the type widely used to protect the sides of automotive vehicles from casual damage.

BACKGROUND OF THE INVENTION

Plastic body side moldings are widely used on automobiles, especially to protect against damage from an opening door on an adjacent vehicle. Conveniently, the molding is provided with a pressure-sensitive adhesive layer which is protected by a disposable liner that is removed immediately before adhering the molding to an automobile.

Durable and esthetically pleasing body side moldings may be formed of weather-resistant plastics such as plasticized vinyl chloride polymers which, while resilient, are only moderately flexible. After a period of time, an edge of the molding may lift and loosen if the normal crosswise curvature of its adhesive surface is much different from that of the underlying surface. This tendency may be reduced by a cushioning foam layer in conjunction with the adhesive as in U.S. Pat. No. 3,572,798 (Kunevicius). As a further safeguard, the patent teaches that the molding may be prestressed and bowed longitudinally to match the typical longitudinal curvature of an automobile.

For protecting a break line, it is customary to form the body side molding to fit the angle of the break. If not perfectly aligned, one face of the molding tends to lift and loosen.

The tendency of body side molding to lift and loosen would be reduced if the molding were more conformable. A molding strip which is indicated to have good conformability is shown in U.S. Pat. No. 3,635,787 (Shanok et al.). Its inward-facing surface is formed with a plurality of spaced notches which are said to permit longitudinal folding up to 90°. Another style which has the appearance of some conformability is shown in U.S. Pat. No. 3,436,297 (Brooks et al.), especially in FIGS. 5 and 6. Neither of the last two mentioned patents says anything about using the molding on a vehicle.

A body side molding for an automobile formed with a V-notch in its underside is shown in Catalog No. 308 of J. C. Whitney & Co., Chicago, Illinois, at page 37, part No. 15-2667.

Other body side moldings are shown in U.S. Pat. No. 3,543,465 (Jackson) and U.S. Pat. No. 3,451,709 (Swauger).

THE PRESENT INVENTION

The body side molding of the present invention is similar in exterior appearance and material to moldings presently in automotive use in that it primarily comprises a tough, resilient plastic*, is of essentially uniform cross-section and has at least two relatively flat surfaces for receiving adhesive to attach it to an automobile or other vehicle. Like body side moldings of the prior art, the adhesive-receiving surfaces extend across most of the width of the molding substantially to each of its sidewise extremities. Other surfaces of the molding provide a durable, impact-absorbing, scuff- and weather-resistant exterior by virtue of its tough plastic body and/or thin decorative foil covering all or a portion of the exterior. As in the prior art, useful foils include metal sheet, metallized plastic film and retroreflective sheeting. The novel molding differs from those of the prior art in that its plastic body is formed with at least one broad channel extending between the adhesive-receiving surfaces to enable the adhesive-receiving surfaces of the molding to conform to curved substrates without distorting the top of the molding. More specifically a. its plastic body is formed to have a trunk and two ankles, each defining one sidewise extremity of the molding and, terminating in a foot which supports at least part of one of said flat adhesive-receiving surfaces, b. the total ankle thickness is less than 50% of the overall width of the plastic body, thus creating one or more channels beneath the trunk, and c. the average thickness of each foot portion of the plastic body which protrudes laterally beyond an ankle is less than ⅛ of the overall height of the molding so that such foot portions are sufficiently flexible to permit the adhesive-receiving surface to conform to the side of a vehicle.

Because of its improved conformability and consequently lessened tendency toward edge lifting, a cushioned adhesive layer should not be necessary, although one may be employed if desired.

*As used herein, "plastic" encompasses rubbers and elastomers.

The channel or channels beneath the trunk of the plastic body may be either open or filled in whole or in part with a soft, compliant plastic foam of a sort that does not substantially interfere with the conformability of the molding. Preferably, at least one groove is formed in the trunk of the plastic body adjacent each channel to provide a hinging action that enhances conformability. For superior hinging action, the thickness of the trunk at the groove is less than one-half the average thickness of the trunk adjacent the channel. Such grooves may additionally serve to secure and protect the edges of a decorative foil.

The novel molding may be made by extruding any tough, resilient plastic material which is suitable for outdoor use. Particularly preferred are vinyl chloride homopolymers and copolymers that may contain materials with which they are usually blended for body side molding use, e.g., plasticizers, pigments and other ultraviolet-inhibiting materials, antioxidants, lubricants and inert fillers. In addition to being durable, they have good elastic memory so that indentations from moderate impact quickly disappear. The molding may instead be made by casting any liquid system which will yield a tough, resilient polymeric material upon curing in a suitable mold. Mineral-filled polyurethanes prepared from combinations of polypropylene diol and triols with toluene diisocyanate are particularly useful.

For convenience of application, each adhesive-receiving surface of the molding preferably bears a pressure-sensitive adhesive layer. Solvent-activated and heat activated adhesive coatings are also useful and may either be applied at the time of manufacture or may be coated out by the user at the time of application. Two-part curing adhesives may either be coated at the time of application or may be pre-applied if of a latent type, e.g., by microencapsulation of the curing agent.

THE DRAWING

In the drawing:

FIGS. 1 and 2 are schematic cross-sections of body side moldings which employ certain concepts of the invention but are not encompassed by the claims.

Each of FIGS. 3–8 is a schematic cross-section of a body side molding which embodies the invention.

The body side molding shown in FIG. 1 includes an extruded plastic body having an I-shaped cross-section, one cross of the I providing a trunk 11, the other cross of the I providing a single foot 12, and the connecting portion of the I providing an ankle 13. Substantially the entire under-surface of the foot 12 bears an adhesive layer 14. The two channels between the foot and the trunk are filled with soft, conformable plastic foam 15 which affords a finished appearance to the exterior and also serves to keep out dirt and debris.

The body side molding of FIG. 1 may have the following dimensions: overall width 20 mm; overall height 10 mm; ankle width 5 mm; thickness of portions of foot protruding beyond the ankle 1.5 mm exclusive of the adhesive; adhesive thickness 0.25 mm, or 0.8 mm if the adhesive layer includes a cushioning foam.

The body side molding of FIG. 2 includes an extruded plastic body consisting of a trunk 21, an ankle 23 and a foot 22. Coextensive with the bottom surface of the foot is an adhesive layer 24. A decorative foil 26 is adhered to the exterior surface of the trunk 21. By mounting the molding horizontally on a vertical panel with the ankle 23 at the top, there should be no need for filling the channel 25 with foam. The ends of the molding may be capped, shaped or coated with a material to close the channel to provide a finished effect. However, the presence of a compliant foam in the channel 25 would simplify esthetic finishing of the ends of the molding with a coating.

The body side molding of FIG. 3 has three feet 32 and three ankles 33, and the underside of its trunk 31 is formed with a pair of grooves 37 at which its thickness is less than one-half its average thickness adjacent its channels 35. Unnecessarily, the under-surfaces of the feet 32 are formed with an overall concavity in view of the fact that the sides of most automobiles are slightly convex in the vertical direction. Regardless of its naturally concave surfaces, the hinging at the grooves 37 permits the outer feet to flex inwardly or outwardly with respect to the central foot. This hinging action plus the flexibility of portions of the feet 32 which protrude laterally beyond the ankles 33 permits the molding to conform readily either to convex or to concave vehicle surfaces.

The body side molding shown in FIG. 4 has a C-shaped cross-section with a foot 42 at each end of the C. The channel between each foot 42 and the trunk 41 is filled with a soft, compliant plastic foam 45. Coextensive with the underlying face of each foot 42 is a thin foam cushioning layer 44b which is adhered to the foot by adhesive 44a. The exposed surface of the cushioning foam 44b carries a pressure-sensitive adhesive layer 44 which, being tacky, would normally be protected prior to use by a disposable low-adhesion liner (not shown). The exterior surface of that portion of the trunk 41 which is adjacent the foam-filled channel area 45 is formed with grooves 47 to further enhance its conformability.

In the body side molding of FIG. 5, a strip of soft, compliant foam 55 fits into the channel adjacent the trunk 51 and the ankle 53. The foot 52 of the ankle 53 and the foam 55 together provide a flat under-surface for an adhesive layer 54. A second ankle 53a and foot 52a are so formed that the normal plane of the underlying surface of the foot 52a which carries an adhesive layer 54a deviates by about 18° from the normal plane of the adhesive layer 54. This molding is especially adapted to be positioned over a horizontal break line of the same angle along the side of an automobile. A pair of decorative foils 56 are adhered to exterior surfaces of the molding. The grooves 57 in that surface are formed to receive and protect the edges of the foils.

The body side molding shown in FIG. 6 is formed of two separately extruded plastic strips, each having a foot 62, an ankle 63 and portions 61a and 61b which are joined into a single trunk 61 by a tough, flexible decorative foil 66 which is retained in place by an adhesive (not shown). The foil 66 provides the same sort of hinging action as do the grooves 37 and 47 of the body side moldings shown in FIGS. 3 and 4, respectively.

The extruded plastic body of the body side molding of FIG. 7 has a trunk 71 and two ankles 73. A pair of foils 76 protrude beyond the feet 72 of the ankles 73 to provide flat surfaces for adhesive layers 74 which are substantially broader than the feet 72. Preferably the thickness of the foils 76 is at least 0.1 mm. The thickness of the trunk 71 at the grooves 77 which secure the other edges of the foils 76 is less than half the overall thickness of that portion of the trunk which is adjacent the channel 75 to provide two hinging points for especially good conformability.

The body side molding of FIG. 8 has a C-shaped cross-section with a foot 82 at each end of the C, a trunk 81, two ankles 83, two adhesive layers 84 and a pair of decorative foils 86. The thickness of the trunk 81 at the grooves 87 is less than half the overall thickness of the trunk at the channel 85.

EXAMPLE 1

A long rectangular strip of soft, compliant foam (open-cell polyesterurethane having a density of 32 kg/m$^3$) was obtained measuring 4 mm by 19 mm in cross-section. Also provided was a mold having an open cavity shaped to form the curved upper surfaces of the body side molding of FIG. 4. To provide the body of the molding, a curing urethane composition was prepared consisting of 45 parts by weight of polypropylene diols and triols, 10 parts of toluene diisocyanate and 45 parts of clay filler.

After spraying the mold cavity with a mold release agent, the freshly prepared urethane composition was poured into the mold to fill the bottom portion to a depth of about 4 mm. After allowing to gel for 5 minutes at 24°C, the foam strip was laid on the gelled resin centrally over the length of the mold. Another batch of the curing urethane composition was mixed and poured along each side of the foam and over the top to fill the mold, and a solid bar was placed across the top to level the surface. After curing the composition at 65°C in an air-circulating oven for 10 minutes, the cured resin was removed from the mold and the flat surface which had been in contact with the solid bar was lightly abraded until smooth. The abraded surface was then coated with a solution of an adhesive of U.S. Pat. No. 3,285,888, and after drying for a few seconds until tacky, a thin neoprene foam having a pressure-sensitive adhesive layer on each side was adhered to the tacky surface by rolling with a steel roller against a low-adhesion liner which was protecting the opposite surface of the double-coated foam. The double-coated neoprene foam was of a type commonly used in the prior art for cushioning body side molding. The neoprene foam was closed cell, 800 kg/m$^3$ and 0.75 mm in thickness. Its pressure-sensitive adhesive surface layers consisted of a copolymer of 90 parts isooctylacrylate and 10 parts by weight acrylic acid.

To provide the molding shown in FIG. 4, a longitudinal channel 2 mm wide and 5 mm deep through the central preformed foam strip was formed by parallel razor blade cuts. This molding was sufficiently conformable that it could be adhered by its own adhesive layers 44 to either the inside or outside surfaces of a right angle cover.

EXAMPLE 2

One hundred parts by weight of dispersion grade homopolymer of polyvinyl chloride was compounded with 30 parts of a polyadipate plasticizer, 20 parts of calcium carbonate powder, 5 parts of barium-cadmium stabilizer in epoxidized soya oil and 1 part of 30% channel black dispersion in polyvinyl chloride resin in a heated screw-type extruder and delivered through an appropriate orifice at 190°C to form the plastic body of the molding of FIG. 8. A pair of strips of decorative foil (Dorrie Process Co. No. F-3080575, A decorative trilaminate) were pressed against the plastic body before it had cooled. The decorative foil comprised biaxially-oriented polyethylene terephthalate film of 0.012 mm thickness vapor coated on one side with aluminum and protected on the other side by polyvinyl-fluoride film of 0.025 mm thickness. Over the aluminum vapor coat was a vinyl polymer coating which fused to the molding under the heat retained from its extrusion to provide a strong bond.

The under-surface of the molding was then coated with a solution of an adhesive of U.S. Pat. No. 3,285,888 which dried in a few seconds to a tacky state, and to this tacky adhesive coating was applied a double-coated neoprene foam strip as described in Example 1.

Using a router, a longitudinal channel of about 2 mm width was cut centrally through the neoprene foam to extend about 4 mm into the plastic body of the molding. Then using a grinding disc of 2 mm thickness and 10 mm diameter, the channel was enlarged to a width of about 10 mm in the shape of channel 85 of FIG. 8, thus converting the plastic body to a C-shaped cross-section as described above.

I claim:

1. Body side molding of essentially uniform cross-section comprising a tough, resilient plastic body and having at least two relatively flat surfaces for receiving an adhesive to attach the molding to the side of a vehicle, which adhesive-receiving surfaces extend across most of the width of the molding substantially to each of its sidewise extremities, other surfaces of the molding providing a tough, durable scuff- and weather-resistant, impact-absorbing and esthetically pleasing exterior, characterized by the features that
   a. the plastic body is formed to have a trunk and two ankles, each defining one sidewise extremity of the molding and terminating in a foot which supports at least part of one of said adhesive-receiving surfaces,
   b. the total ankle thickness is less than 50% of the overall width of the plastic body,
   c. there is a channel at the underside of the trunk and at least one groove formed in the trunk adjacent the channel such that the thickness of the trunk at the groove is less than one-half the average thickness of the trunk at said channel, and
   d. the average thickness of each foot portion of the plastic body which protrudes laterally beyond an ankle is less than ⅓ of the overall height of the molding, which features enable the adhesive-receiving surfaces to conform to curved substrates without distorting the top of the molding.

2. Body side molding as defined in claim 1 further characterized by the feature that at least one channel at the underside of the trunk is at least partially filled with a soft, compliant foam which does not substantially interfere with the conformability of the molding.

3. Body side molding as defined in claim 2 further characterized by the feature that said foot and foam abut and together provide said relatively flat adhesive-receiving surface.

4. Body side molding as defined in claim 1 further characterized by the feature that an adhesive layer is adhered to each adhesive-receiving surface.

5. Body side molding as defined in claim 4 further characterized by the feature that each adhesive layer is a pressure-sensitive adhesive layer and is normally protected by a disposable low-adhesion liner.

6. Body side molding as defined in claim 1 further characterized by the feature that there is at least one decorative foil adhered to the exterior of the plastic body.

7. Body side molding as defined in claim 6 further characterized by the feature that the decorative foil extends around the ankles at the sidewise extremities and across the foot of each such ankle, and an adhesive layer is adhered to the face of the decorative foil opposite the foot.

8. Body side molding as defined in claim 1 further characterized by the feature that said plastic body has a C-shaped cross-section and a foot at each end of the C protruding laterally toward the other foot.

9. Body side molding as defined in claim 8 further characterized by the feature that the adhesive-receiving surfaces are normally planar and the plane of one deviates from the plane of the other by an angle of 5°–45°.

10. Body side molding as defined in claim 8 further characterized by the feature that the two feet nearly touch each other to provide adhesive-receiving surfaces which are nearly the full width of the molding.

11. Body side molding as defined in claim 5 further characterized by the feature that the adhesive layer includes a cushioning foam.

12. Body side molding of essentially uniform cross-section comprising a tough, resilient plastic body and having at least one relatively flat surface for receiving an adhesive to attach the molding to the side of a vehicle, other surfaces of the molding providing a tough, durable scuff- and weather-resistant, impact-absorbing and esthetically pleasing exterior, characterized by the feature that
   a. the plastic body is formed to have a trunk and at least one ankle terminating in a foot which supports at least part of said adhesive-receiving surface,
   b. the total ankle thickness is less than 50% of the overall width of the plastic body,
   c. the average thickness of any and all foot portions of the plastic body which protrude beyond an ankle is less than ⅓ of the overall height of the molding, and
   d. said plastic body is formed in two parts, each having a foot, an ankle and a trunk portion which is joined to the other trunk portion by a tough, flexible foil to provide a single molding having a hinging action at the foil.

* * * * *